(12) United States Patent
Houser

(10) Patent No.: US 12,194,841 B1
(45) Date of Patent: Jan. 14, 2025

(54) SHIFTABLE WHEEL END REDUCTION FOR WHEELED VEHICLES

(71) Applicant: PACCAR Inc, Bellevue, WA (US)

(72) Inventor: Jordan Michael Houser, Lewisville, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 18/444,347

(22) Filed: Feb. 16, 2024

(51) Int. Cl.
  *B60K 17/04* (2006.01)
  *B60K 17/02* (2006.01)
  *F16H 3/44* (2006.01)

(52) U.S. Cl.
  CPC ............ *B60K 17/046* (2013.01); *B60K 17/02* (2013.01); *F16H 3/44* (2013.01); *F16H 2200/0021* (2013.01); *F16H 2200/0034* (2013.01); *F16H 2200/2005* (2013.01); *F16H 2200/2094* (2013.01)

(58) Field of Classification Search
  CPC ......... B60K 17/046; B60K 17/02; F16H 3/44; F16H 2200/0021; F16H 2200/0034; F16H 2200/2005; F16H 2200/2094
  See application file for complete search history.

(56) References Cited

U.S. PATENT DOCUMENTS

| | | | | |
|---|---|---|---|---|
| 5,382,854 | A * | 1/1995 | Kawamoto | B60K 17/046 310/67 R |
| 7,527,574 | B2 * | 5/2009 | Han | B60K 17/02 475/198 |
| 11,603,909 | B2 * | 3/2023 | Lee | F16H 3/728 |
| 2017/0182884 | A1 * | 6/2017 | Jeong | B60K 1/02 |
| 2019/0248247 | A1 * | 8/2019 | Yamaguchi | B60K 1/02 |
| 2020/0276895 | A1 * | 9/2020 | Mepham | B60K 17/046 |
| 2020/0282827 | A1 * | 9/2020 | Kaltenbach | B60K 1/02 |
| 2021/0245599 | A1 * | 8/2021 | Mepham | B60B 35/16 |
| 2024/0059131 | A1 * | 2/2024 | Cattoor | B60K 17/16 |

FOREIGN PATENT DOCUMENTS

DE 102021203043 A1 * 10/2021 ........... B60K 17/046

* cited by examiner

*Primary Examiner* — Jacob S. Scott
*Assistant Examiner* — Farhana Pervin
(74) *Attorney, Agent, or Firm* — Seed IP Law Group LLP

(57) ABSTRACT

A shiftable wheel end reduction may be mechanically coupled to a driven axle shaft and to a driven wheel of a wheeled vehicle. The shiftable wheel end reduction may be switched between a first operating mode, in which torque carried by the driven axle shaft is increased and transferred to the driven wheel by the shiftable wheel end reduction, and a second operating mode, in which torque carried by the driven axle shaft is maintained and transferred to the driven wheel by the shiftable wheel end reduction.

10 Claims, 3 Drawing Sheets

SHIFTABLE WHEEL END REDUCTION FOR WHEELED VEHICLES

BACKGROUND

Technical Field

The present disclosure relates to a shiftable wheel end reduction, which can change a flow of power from an engine or motor to a wheel of a wheeled vehicle, such as a passenger vehicle, heavy duty truck, etc., to adjust torques and speeds provided to the wheels. The present disclosure further relates to powertrains or drivetrains, which carry or deliver mechanical power from an engine or motor to drive wheels of a wheeled vehicle. Such technologies may be implemented, for example, in electric vehicles.

Description of the Related Art

In general, it is known in automotive engineering for an engine or motor to generate or produce mechanical power that is carried or delivered through a drive train to one or more drive axles and thereby to driven wheels of the vehicle.

BRIEF SUMMARY

A wheeled vehicle may be summarized as comprising: a driven axle shaft; a driven wheel; and a shiftable wheel end reduction mechanically coupled to the driven axle shaft and to the driven wheel; wherein the shiftable wheel end reduction is configured to be switched between a first operating mode, in which torque carried by the driven axle shaft is modified and transferred to the driven wheel by the shiftable wheel end reduction, and a second operating mode, in which torque carried by the driven axle shaft is maintained and transferred to the driven wheel by the shiftable wheel end reduction.

The shiftable wheel end reduction may include a planetary gear set including an outer ring gear, a plurality of planet gears, a gear carrier, and a sun gear. The driven wheel may be rigidly coupled to the gear carrier. The sun gear may be rigidly coupled to the driven axle shaft. The wheeled vehicle may further comprise: an axle body; wherein the gear carrier is rotatably mounted on the axle body by a roller bearing. The wheeled vehicle may further comprise: a first clutch having an engaged configuration, in which the outer ring gear is rigidly coupled and mechanically locked to the axle body, and a disengaged configuration, in which the outer ring gear is rotatable with respect to the axle body; and a second clutch having an engaged configuration, in which the outer ring gear is rigidly coupled and mechanically locked to the gear carrier, and a disengaged configuration, in which the outer ring gear is rotatable with respect to the gear carrier. The wheeled vehicle may further comprise: an actuator that extends through an opening in the axle body and mechanically engages with the outer ring gear inside the axle body; wherein the actuator is configured to move the outer ring gear inward towards the axle body to engage the first clutch and disengage the second clutch; wherein the actuator is configured to move the outer ring gear outward away from the axle body to disengage the first clutch and engage the second clutch. The wheeled vehicle may be an electric vehicle including an electric motor that generates mechanical power and supplies the mechanical power to the driven axle shaft.

The driven wheel may be coupled to a first end of the driven axle shaft and the wheeled vehicle may further comprise: a second driven wheel coupled to a second end of the driven axle shaft opposite to the first end of the driven axle shaft; and a second shiftable wheel end reduction mechanically coupled to the driven axle shaft and to the second driven wheel; wherein the second shiftable wheel end reduction is configured to be switched between a first operating mode, in which torque carried by the driven axle shaft is increased and transferred to the second driven wheel by the second shiftable wheel end reduction, and a second operating mode, in which torque carried by the driven axle shaft is maintained and transferred to the second driven wheel by the second shiftable wheel end reduction. In the first operating mode, torque carried by the driven axle shaft may be increased by a factor of between 2 and 5 and transferred to the driven wheel by the shiftable wheel end reduction.

A method of operating a wheeled vehicle may be summarized as comprising: switching a shiftable wheel end reduction from a first operating mode, in which torque carried by a driven axle shaft is modified and transferred to a driven wheel by the shiftable wheel end reduction, to a second operating mode, in which torque carried by the driven axle shaft is maintained and transferred to the driven wheel by the shiftable wheel end reduction.

The shiftable wheel end reduction may include a planetary gear set including an outer ring gear, a plurality of planet gears, a gear carrier, and a sun gear; the wheeled vehicle may include an axle body; and the gear carrier may be rotatably mounted on the axle body by a roller bearing. Switching the shiftable wheel end reduction from the first operating mode to the second operating mode may include: disengaging a first clutch such that the outer ring gear is rotatable with respect to the axle body; and engaging a second clutch such that the outer ring gear is rigidly coupled and mechanically locked to the gear carrier. Switching the shiftable wheel end reduction from the first operating mode to the second operating mode may further include moving the outer ring gear outward away from the axle body to disengage the first clutch and engage the second clutch.

The method may further comprise, simultaneously with the switching of the shiftable wheel end reduction: switching a second shiftable wheel end reduction from a first operating mode, in which torque carried by the driven axle shaft is increased and transferred to a second driven wheel by the second shiftable wheel end reduction, to a second operating mode, in which torque carried by the driven axle shaft is maintained and transferred to the second driven wheel by the second shiftable wheel end reduction.

A method of operating a wheeled vehicle may be summarized as comprising: switching a shiftable wheel end reduction from a first operating mode, in which torque carried by a driven axle shaft is maintained and transferred to a driven wheel by the shiftable wheel end reduction, to a second operating mode, in which torque carried by the driven axle shaft is modified and transferred to the driven wheel by the shiftable wheel end reduction.

The shiftable wheel end reduction may include a planetary gear set including an outer ring gear, a plurality of planet gears, a gear carrier, and a sun gear; the wheeled vehicle may include an axle body; and the gear carrier may be rotatably mounted on the axle body by a roller bearing. Switching the shiftable wheel end reduction from the first operating mode to the second operating mode may include: engaging a first clutch such that the outer ring gear is rigidly coupled and mechanically locked to the axle body; and disengaging a second clutch such that the outer ring gear is rotatable with respect to the gear carrier. Switching the shiftable wheel end reduction from the first operating mode to the second operating mode may further include moving the outer ring gear inward toward the axle body to engage the first clutch and disengage the second clutch. The method may further comprise, simultaneously with the switching of the shiftable wheel end reduction: switching a second shiftable wheel end reduction from a first operating mode, in which torque carried by the driven axle shaft is maintained and transferred to a second driven wheel by the second shiftable wheel end reduction, to a second operating mode, in which torque carried by the driven axle shaft is increased and transferred to the second driven wheel by the second shiftable wheel end reduction.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology, such as powertrain components, have not been shown or described in detail to avoid unnecessarily obscuring descriptions of the embodiments. For example, the drawings may include simplified schematic representations of components of the disclosed embodiments to avoid unnecessarily obscuring descriptions of the embodiments.

Figure 1:
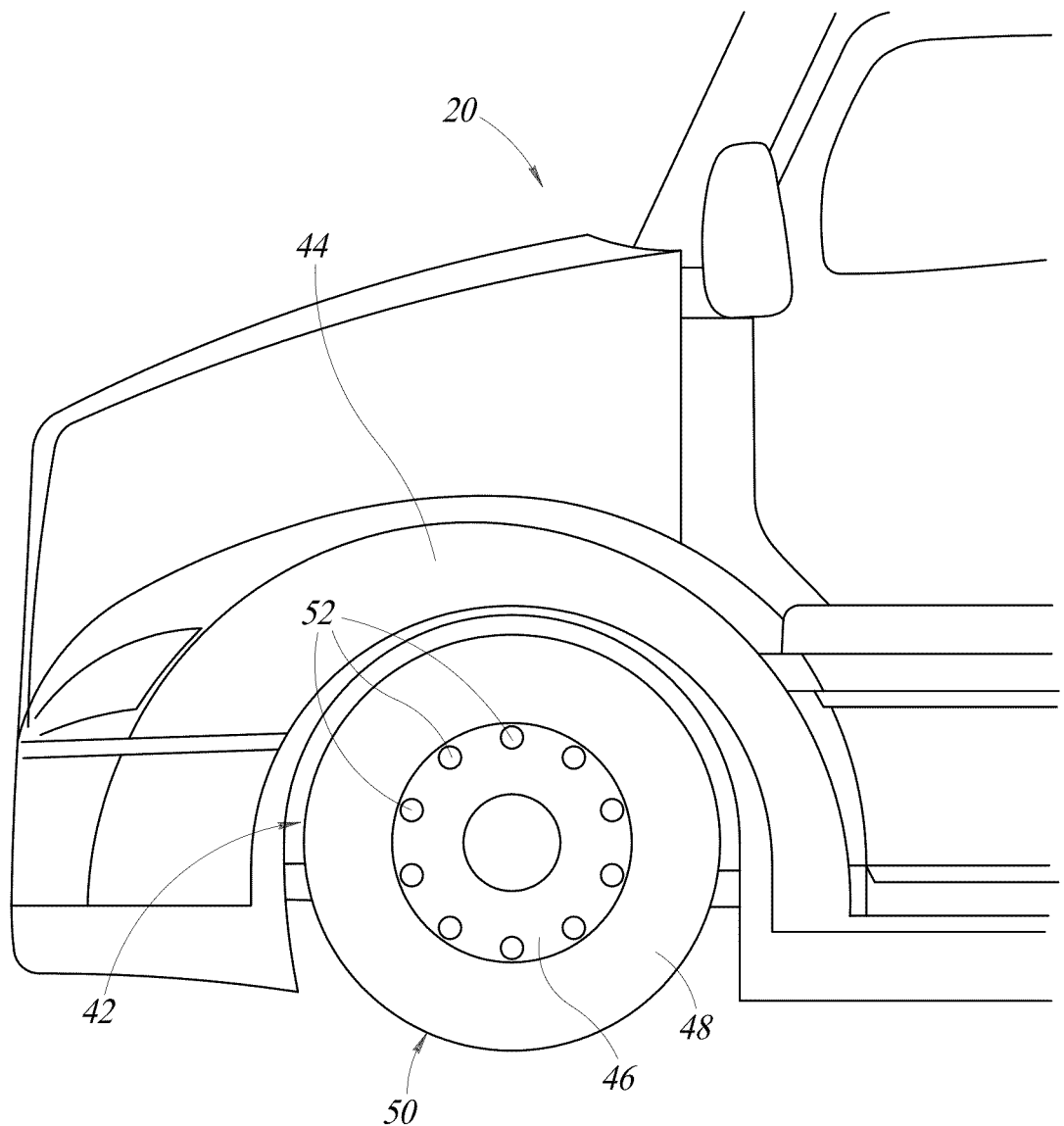
FIG. 1 illustrates a side view of a front portion of a truck.

FIG. 1 illustrates a vehicle 20 comprising a wheel 46, a wheel well 42, and a fender 44. The fender 44 surrounds the wheel well 42, and the wheel 46 is positioned within the wheel well 42. A tire 48 is mounted on the wheel 46. The tire 48 has a ground contact surface 50 that has a tread. The ground contact surface 50 is configured to, in operation, contact a ground surface that the vehicle 20 is driven on. For example, the ground surface may be dirt, gravel, asphalt, concrete, or some other material that acts as a road or is driven on. The wheel 46 is mounted to an axle of the vehicle 20 by a plurality of fasteners 52, which may include threaded bolts or wheel studs. For example, in some embodiments, a wheel hub assembly is rigidly coupled to a terminal end portion of an axle, such that the wheel hub assembly cannot move or rotate with respect to the axle. Such a connection may be made using, for example, splined teeth. Further, the wheel 46 is bolted or otherwise rigidly coupled to the wheel hub assembly, such as by the fasteners 52, such that the wheel 46 cannot move or rotate with respect to either the wheel hub assembly or the axle. The axle, in this description, may be a drive axle that is driven to rotate with respect to a body of the vehicle 20 by an engine or motor mounted within the body of the vehicle 20.

Figure 2A:
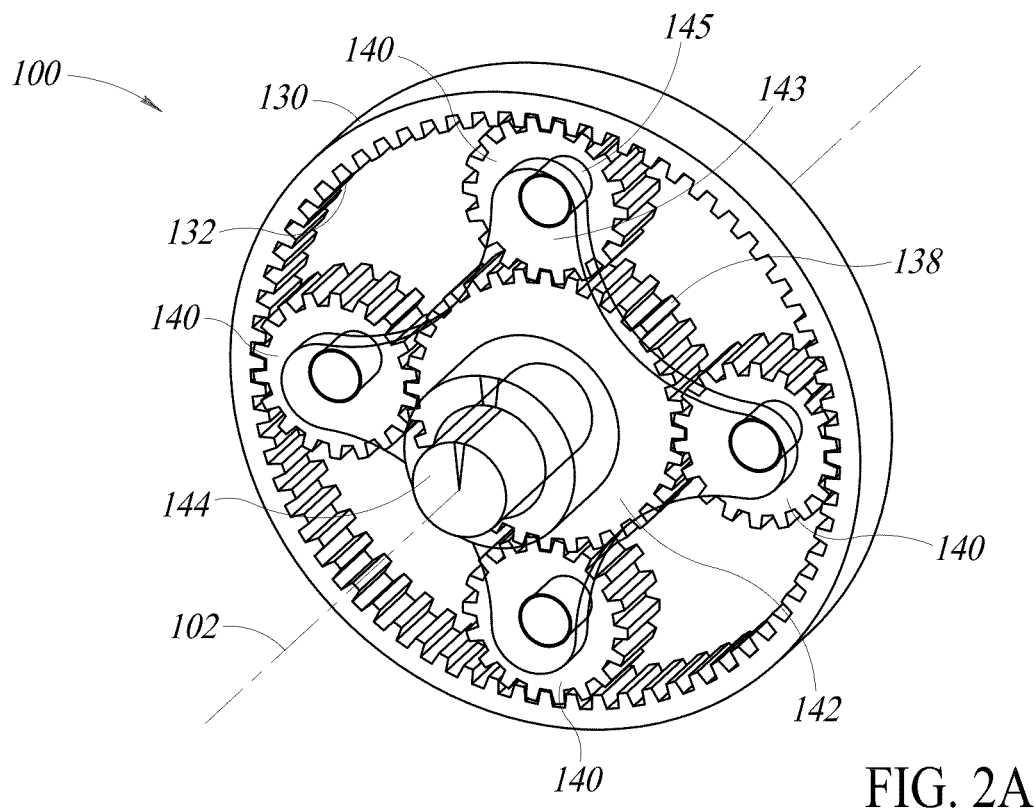
FIG. 2A illustrates a planetary gear set in a first configuration.
Figure 2B:
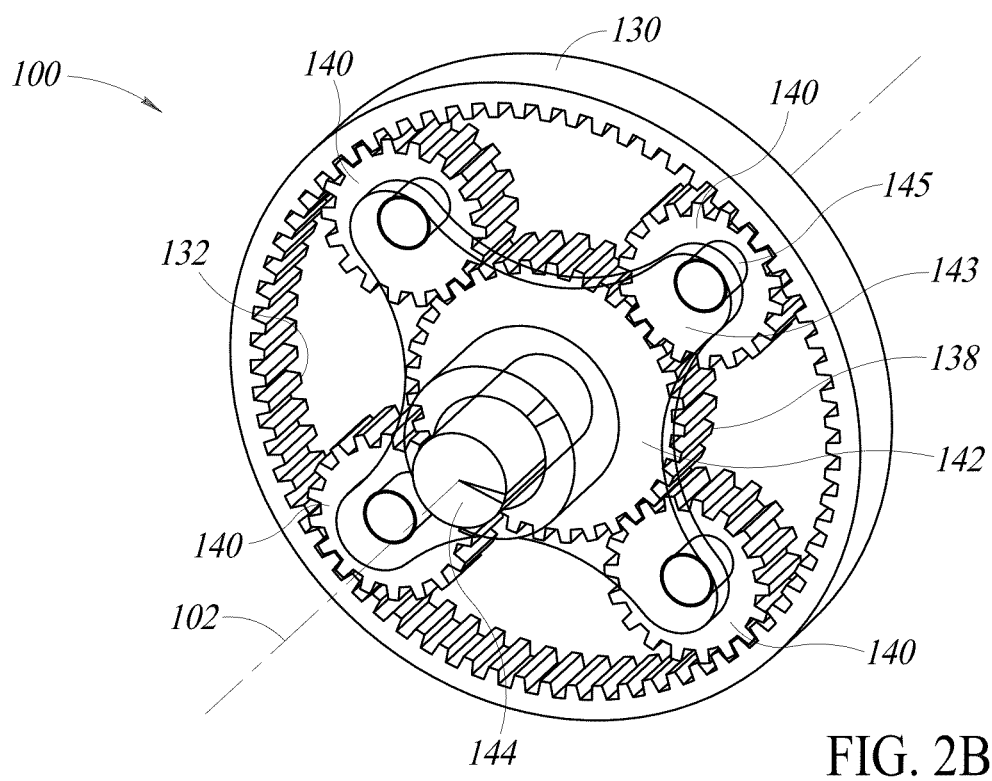
FIG. 2B illustrates the planetary gear set of FIG. 2A in a second configuration, in which some of the gears of the planetary gear set have rotated relative to their positions and orientations in the first configuration.

FIGS. 2A and 2B illustrate a planetary gear set or planetary gear train 100. As illustrated in FIGS. 2A and 2B, a planetary gear set 100 may include a hollow and generally cylindrical outer ring gear 130. As illustrated in FIGS. 2A and 2B, the ring gear 130 has an overall cylindrical shape that extends along a central longitudinal axis 102 of the planetary gear set 100, and has a cylindrical open internal space that extends along the central longitudinal axis 102. As also illustrated in FIGS. 2A and 2B, the ring gear 130 has a generally cylindrical internal surface 132. As illustrated in FIGS. 2A and 2B, the internal surface 132 of the ring gear 130 includes a set of inward-facing inner gear teeth. The set of inner gear teeth of the ring gear 130 mate with and engage with other gear teeth of other gears of the planetary gear set 100.

As illustrated in FIGS. 2A and 2B, the planetary gear set 100 further includes, in addition to the outer ring gear 130, a sun gear 138 having, and rotatable about, a central longitudinal axis coincident with the central longitudinal axis 102 of the planetary gear set 100, a set of four planet gears 140 spaced equidistantly apart from one another about the sun gear 138 and each having, and rotatable about, a respective central longitudinal axis parallel to and offset from the central longitudinal axis 102 of the planetary gear set 100, and a gear carrier 142 having, and rotatable about, a central longitudinal axis coincident with the central longitudinal axis 102 of the planetary gear set 100. Each of the planet gears 140 has external gear teeth meshed with the internal gear teeth of the outer ring gear 130, and the sun gear 138 has external gear teeth meshed with the external gear teeth of each of the planet gears 140. Thus, the gears of the planetary gear set 100 are engaged and meshed with one another such that rotation of the sun gear 138 about the central longitudinal axis 102 relative to the outer ring gear 130 (which is equivalent in this sense to rotation of the outer ring gear 130 about the central longitudinal axis 102 relative to the sun gear 138) drives each of the planet gears 140 to rotate about their own central longitudinal axis as well as to orbit the sun gear 138.

FIGS. 2A and 2B illustrate that the gear carrier 142 includes a generally plate-shaped disc that may have a generally cruciform shape, the cruciform shape formed at least in part by four lobes 143 of the gear carrier 142, where each lobe of the cruciform shape carries a respective peg, pin, or shaft 145 that extends outward from a major surface of the main body of the gear carrier 142 along respective axes parallel to and offset from the central longitudinal axis 102 of the planetary gear set 100 toward the planet gears 140. In use, the planet gears 140 are rotatably mounted onto the shafts 145 of the gear carrier 142 such that, as the planet gears 140 orbit circumferentially as a unit about the sun gear 138 and the central longitudinal axis 102, the gear carrier 142 is also driven to rotate about the central longitudinal axis 102. FIG. 2A illustrates the planetary gear set 100 in a first configuration. FIG. 2B illustrates the planetary gear set 100 in a second configuration, in which the gear carrier 142 is rotated 45° clockwise about the central longitudinal axis 102 relative to its orientation in FIG. 2A, the sun gear 138 is rotated 90 degrees clockwise about the central longitudinal axis 102 relative to its orientation in FIG. 2A, and the ring gear 130 is in the same orientation about the central longitudinal axis 102 as illustrated in FIG. 2A. That is, the rotational speed of the sun gear 138 may generally be higher than (e.g., twice) the rotational speed of the gear carrier 142.

In some embodiments, the planetary gear set 100 may be provided at a mechanical connection between an end of a driven axle of a vehicle and a driven wheel of the vehicle, such as to increase a driving torque and decrease a driving speed of the wheel relative to the axle, or to decrease a driving torque and increase a driving speed of the wheel relative to the axle. For example, a driven axle shaft 144 may be rigidly coupled to the sun gear 138, such as by spline teeth, by being formed integrally therewith, etc. Further, the gear carrier 142 may be rigidly coupled to a driven wheel, such as by spline teeth, being formed integrally therewith, etc. In some embodiments, the gear carrier 142 may be a component of a wheel hub assembly to which a wheel (e.g., wheel 46) or a rim thereof is bolted or otherwise rigidly coupled, such that the wheel 46 cannot move or rotate with respect to the wheel hub assembly or with respect to the gear carrier 142.

Figure 3:
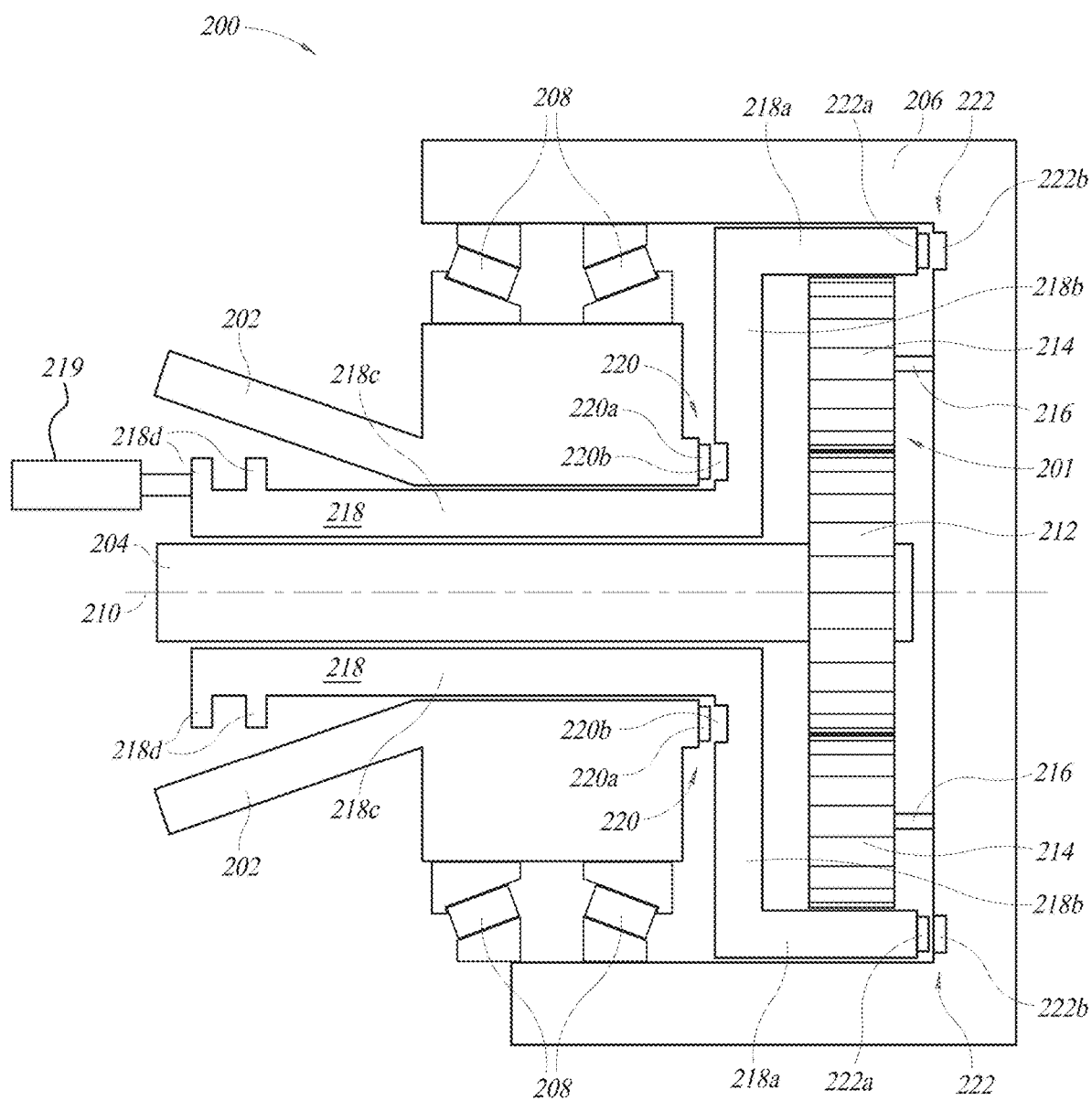
FIG. 3 illustrates a shiftable wheel end reduction incorporating a planetary gear set.

For example, FIG. 3 illustrates a shiftable wheel end reduction 200 which includes a planetary gear set 201 similar to the planetary gear set 100 that is illustrated in FIGS. 2A and 2B. In particular, FIG. 3 illustrates an axle body 202, which may comprise a hollow, generally cylindrical tube. The axle body 202 may be rigidly coupled to a frame or chassis of a vehicle, or may be coupled by a suspension of the vehicle to a frame or chassis thereof. In either case, the axle body 202 may be coupled to the frame or chassis such that it does not undergo continuous, sustained, gross, and/or major movement (e.g., rotation and/or translation) with respect to the frame or chassis, even if the axle body 202 may undergo temporary, transient, fine, or minor movement (e.g., rotation and/or translation) with respect to the frame and/or chassis. FIG. 3 further illustrates that a driven axle shaft 204, which may be a solid cylindrical rod, extends through an interior of the hollow, generally cylindrical tube of the axle body 202. The driven axle shaft 204 may be driven by an engine or motor of the vehicle to rotate about its own central longitudinal axis with respect to most of the rest of the vehicle of which it is a part, including a body, frame, and/or chassis thereof, as well as with respect to the engine or motor and the axle body 202 thereof.

As further illustrated in FIG. 3, the shiftable wheel end reduction 200 includes a gear carrier 206, which may function in much the same way as the gear carrier 142. In addition, the gear carrier 206 may also be rigidly coupled to a driven wheel of the vehicle, such as by spline teeth, by bolts or wheel studs, by being formed integrally therewith, etc. In some embodiments, the gear carrier 206 may be a component of a wheel hub assembly to which a wheel (e.g., wheel 46) is bolted or otherwise rigidly coupled, such that the wheel 46 cannot move (e.g., rotate or translate) with respect to the wheel hub assembly or with respect to the gear carrier 206. As further illustrated in FIG. 3, the gear carrier 206 (which may function as a wheel hub assembly or a component thereof) is mounted on the axle body 202 by one or more roller bearings 208. Thus, the gear carrier 206 (and/or wheel hub assembly) may be mounted on the axle body 202 such that the gear carrier 206 can rotate freely with respect to the axle body 202 about a central longitudinal axis 210 thereof, but cannot otherwise move (that is, translate or rotate about other axes) with respect to the axle body 202.

In some cases, the driven axle shaft 204 may be rigidly mechanically coupled to the gear carrier 206 (and/or to the wheel hub assembly), such as by spline teeth or by being formed integrally therewith, such that the gear carrier 206 cannot move (that is, rotate and/or translate) with respect to the driven axle shaft 204. In such cases, the gear carrier 206 and a wheel rigidly coupled thereto are driven to rotate at the same speed and torque as the driven axle shaft 204. In other cases, as illustrated in FIG. 3, the driven axle shaft 204 is mechanically coupled to the gear carrier 206 (and/or to the wheel hub assembly) by the planetary gear set 201. In such cases, the gear carrier 206 and a wheel rigidly coupled thereto can be driven to rotate at different speeds and torques than the driven axle shaft 204.

In particular, the driven axle shaft 204 is rigidly coupled to a sun gear 212, such as by spline teeth or by being formed integrally therewith, etc. Further, the gear carrier 206 is mechanically coupled to a plurality of (e.g., three, four, or five) planet gears 214, such as by shafts 216. As described with reference to FIGS. 2A and 2B, each of the shafts 216 extends outward from a major surface of the main body of the gear carrier 206 along respective axes parallel to and offset from the central longitudinal axis 210 toward the planet gears 214. In use, the planet gears 214 are rotatably mounted onto the shafts 216 of the gear carrier 206 such that, as the planet gears 214 orbit circumferentially as a unit about the sun gear 212 and the central longitudinal axis 210, the gear carrier 206 also rotates about the central longitudinal axis 210.

FIG. 3 also illustrates that the shiftable wheel end reduction 200 includes a ring gear 218 that extends circumferentially around the sun gear 212 and the planet gears 214. As described with reference to FIGS. 2A and 2B, the ring gear 218 includes internal gear teeth that extend around an inner surface thereof facing towards the sun gear 212 and the planet gears 214. The planet gears 214 have external gear teeth that mesh with the internal gear teeth of the ring gear 218. The sun gear 212 in turn has external gear teeth that mesh with the external gear teeth of the planet gears 214. Thus, the wheel end reduction 200 and its sun gear 212, planet gears 214, gear carrier 206, and ring gear 218 function as a planetary gear set 201 in a manner similar to that described with respect to the planetary gear set 100 of FIGS. 2A and 2B.

FIG. 3 illustrates that the outer ring gear 218 has a first, generally cylindrical portion 218a that carries its inner gear teeth that mesh with and engage the outer gear teeth of the planet gears 214. The outer ring gear 218 also has a second, generally disc-shaped portion 218b that extends radially inward from the first, generally cylindrical portion 218a to adjacent, near, or proximate the driven axle shaft 204. The outer ring gear 218 also has a third, generally cylindrical portion 218c that extends longitudinally from the second, generally disc-shaped portion 218b into the axle body 202 between an inner surface of the axle body 202 and an outer surface of the driven axle shaft 204. The outer ring gear 218 further includes, at a terminal end portion of the third, generally cylindrical portion 218c opposite to the first, generally cylindrical portion 218a, an engagement feature or mechanism, which may include a pair of circumferential ridges or teeth 218d extending circumferentially about an outer surface of the third, generally cylindrical portion 218c, and a circumferential groove located between the ridges 218d.

Other components of the vehicle of which the shiftable wheel end reduction 200 is a part may be mechanically engaged with the ridges 218d and the groove between them to allow the outer ring gear 218 to be moved longitudinally inward relative to the axle body 202 and longitudinally outward relative to the axle body 202 in directions parallel to the central longitudinal axis 210. For example, there may be an opening in a side wall of the axle body 202, through which other mechanical components, such as a lever, switch, actuator 219, shift fork, etc., may extend to engage with and actuate the ridges 218d to move the outer ring gear either inward or outward along the central longitudinal axis 210. The other components of the shiftable wheel end reduction 200, including the driven axle shaft 204, the gear carrier 206, the roller bearings 208, the sun gear 212, and the planet gears 214 are generally mechanically fixed to the axle body 202 such that they cannot translate relative thereto. Thus, moving the outer ring gear 218 longitudinally inward or outward relative to the axle body 202 also moves the outer ring gear 218 longitudinally inward or outward, respectively, relative to the driven axle shaft 204, the gear carrier 206, the roller bearings 208, the sun gear 212, and the planet gears 214.

FIG. 3 further illustrates that the shiftable wheel end reduction 200 includes a first engagement mechanism or clutch 220 and a second engagement mechanism or clutch 222. The first and second engagement mechanisms 220 and 222 may include any suitable type of clutch or other device that allows selective engagement and disengagement of rotating components. In the embodiment illustrated in FIG. 3, the first and second engagement mechanisms 220 and 222 each comprise a "positive clutch" or a "dog clutch," where a first rotating component includes first teeth or dogs that engage with counterpart second teeth or dogs of a second rotating component. In some cases, the teeth or dogs of one of the rotating components may be arranged to form grooves or recesses between the teeth or dogs, where the grooves or recesses are configured to receive the teeth or dogs of the other, counterpart rotating component.

For example, in FIG. 3, the first clutch 220 is composed of a first set of teeth 220a and a first set of counterpart recesses 220b. The first teeth 220a are formed in a terminal distal end surface of the axle body 202 that faces outward away from the axle body 202 and toward a wheel coupled to the gear carrier 206. The first recesses 220b are formed in proximal end surface of the second, generally disc-shaped portion 218b of the ring gear 218 that faces inward toward the axle body 202 and away from a wheel coupled to the gear carrier 206. Thus, the first clutch 220 is configured to prevent relative rotation between the axle body 202 and the ring gear 218 when the first clutch 220 is engaged, that is, when the first teeth 220a are positioned and seated within the first recesses 220b, and to allow relative rotation between the axle body 202 and the ring gear 218 when the first clutch 220 is disengaged, that is, when the first teeth 220a are not positioned and seated within the first recesses 220b.

Similarly, in FIG. 3, the second clutch 222 is composed of a second set of teeth 222a and a second set of counterpart recesses 222b. The second teeth 222a are formed in a terminal distal end surface of the first, generally cylindrical portion 218a of the ring gear 218 that faces outward away from the axle body 202 and toward a wheel coupled to the gear carrier 206. Thus, the ring gear 218 includes a single body containing two clutch interfaces 220b, 222a. The second recesses 222b are formed in proximal end surface of the gear carrier 206 that faces inward toward the axle body 202 and away from a wheel coupled to the gear carrier 206. Thus, the second clutch 222 is configured to prevent relative rotation between the ring gear 218 and the gear carrier 206 when the second clutch 222 is engaged, that is, when the second teeth 222a are positioned and seated within the second recesses 222b, and to allow relative rotation between the ring gear 218 and the gear carrier 206 when the second clutch 222 is disengaged, that is, when the second teeth 222a are not positioned and seated within the second recesses 222b.

When a vehicle incorporating the switchable wheel end reduction 200 is in use, an operator or a control unit of the vehicle can actuate the ring gear 218 to translate inward along the central longitudinal axis 210 toward the axle body 202 and away from a wheel mounted on the gear carrier 206, thereby engaging the first clutch 220 and disengaging the second clutch 222 such that the ring gear 218 is rotationally locked to the axle body 202, that is, with respect to a body, frame, and/or chassis of the vehicle. In such a configuration, power is carried from an engine or motor of the vehicle, to the driven axle shaft 204, to the sun gear 212, which is driven to rotate about the central longitudinal axis 210. Because the ring gear 218 is effectively stationary with respect to the vehicle body, frame, and/or chassis, rotation of the sun gear 212 about the central longitudinal axis 210 drives the planet gears 214 to rotate about their own central longitudinal axes on the shafts 216 and to orbit about the sun gear 212 and the central longitudinal axis 210.

The orbiting of the planet gears 214 about the central longitudinal axis 210, in turn, drives the gear carrier 206 to rotate about the central longitudinal axis 210, at a slower speed and at a higher torque than the sun gear 212 and the driven axle shaft 204. In particular, the rotational speed of the sun gear 212 may generally be higher than (e.g., twice) the rotational speed of the gear carrier 206, and the torque of the sun gear may generally be lower (e.g., half) the torque of the gear carrier 206. Rotation of the gear carrier 206 about the central longitudinal axis 210, in turn, drives rotation of a driven wheel of the vehicle coupled to the gear carrier 206 (which may also function as a wheel hub assembly or a part thereof). Thus, when the first clutch 220 is engaged, torque supplied by an engine or motor of the vehicle to the driven axle shaft 204 is increased and transferred by the switchable wheel end reduction 200 to the wheel.

When a vehicle incorporating the switchable wheel end reduction 200 is in use, an operator or a control unit of the vehicle can actuate the ring gear to translate outward along the central longitudinal axis 210 away from the axle body 202 and toward a wheel mounted on the gear carrier 206, thereby disengaging the first clutch 220 and engaging the second clutch 222 such that the ring gear 218 is rotationally locked to the gear carrier 206, that is, such that the ring gear 218 can rotate freely with respect to a body, frame, and/or chassis of the vehicle but cannot rotate with respect to the gear carrier 206. Because the ring gear 218 cannot rotate about the central longitudinal axis 210 with respect to the gear carrier 206, the planetary gear set 201 of the switchable wheel end reduction 200 is locked, such that none of the gears thereof can rotate with respect to one another and such that all of the gears thereof rotate in unison. In such a configuration, power is carried from an engine or motor of the vehicle, to the driven axle shaft 204, to the sun gear 212, which is driven to rotate about the central longitudinal axis 210. Because the planetary gear set is locked, rotation of the sun gear 212 about the central longitudinal axis 210 drives the rest of the planetary gear set, including the planet gears 214, ring gear 218, and gear carrier 206 to rotate in unison and at the same speed about the central longitudinal axis 210.

In particular, the entirety of the planetary gear set 201 rotates about the central longitudinal axis 210 at the same speed and at the same torque as the sun gear 212 and the driven axle shaft 204. In particular, the rotational speed of the sun gear 212 may generally be the same as the rotational speed of the gear carrier 206, and the torque of the sun gear 212 may generally be the same as the torque of the gear carrier 206. Rotation of the gear carrier 206 about the central longitudinal axis 210, in turn, drives rotation of a driven wheel of the vehicle coupled to the gear carrier 206 (which may also function as a wheel hub assembly or a part thereof). Thus, when the first clutch 220 is disengaged and the second clutch 222 is engaged, torque supplied by an engine or motor of the vehicle to the driven axle shaft 204 is maintained and transferred by the switchable wheel end reduction 200 to the wheel.

Thus, the switchable wheel end reduction 200 allows an operator of a vehicle, or an electronic control unit thereof, to switch between two operating modes: a first operating mode in which mechanical power is supplied to driven wheels of the vehicle at the same rotational speed and torque as the driven axle shaft 204, and a second operating mode in which mechanical power is supplied to driven wheels of the vehicle at a lower rotational speed and a higher torque than the driven axle shaft 204. In some alternative embodiments, however, the switchable wheel end reduction 200 may allow an operator of a vehicle, or an electronic control unit thereof, to switch between two operating modes: a first operating mode in which mechanical power is supplied to driven wheels of the vehicle at the same rotational speed and torque as the driven axle shaft 204, and a second operating mode in which mechanical power is supplied to driven wheels of the vehicle at a higher rotational speed and a lower torque than the driven axle shaft 204.

The wheel end reduction 200 may be shiftable between exactly these two settings or operating modes. That is, "shiftable," in this disclosure, indicates that the wheel end reduction 200 provides a binary choice between, first, maintaining speed and torque through the system, or, second, increasing torque and decreasing speed through the system. In some embodiments, increasing torque and decreasing speed may be by a factor of greater than 2.0, greater than 2.5, greater than 3.0, greater than 3.5, greater than 4.0, or greater than 4.5, and/or less than 2.5, less than 3.0, less than 3.5, less than 4.0, less than 4.5, or less than 5.0. In some embodiments, increasing torque and decreasing speed may be by a factor of 3.5 or about 3.5. Thus, at any moment, either the first clutch 220 is engaged and the second clutch 222 is disengaged, or the first clutch 220 is disengaged and the second clutch 222 is engaged. At no time is it the case that both the first clutch 220 and the second clutch 222 are engaged. Such a configuration, if possible, would rotationally lock the driven wheels to the body, chassis, and/or frame of the vehicle and prevent the vehicle from driving. Similarly, at no time is it the case that both the first clutch 220 and the second clutch 222 are disengaged. Such a configuration, if possible, would rotationally disengage the driven wheels from the rest of the vehicle and prevent the vehicle from being driven.

While the first and second clutches 220, 222, described herein are positive clutches with teeth that are positioned within recesses to engage the clutches, various alternative clutches, such as friction clutches and/or curvic clutches, could be used instead. Further, while the switchable wheel end reduction 200 can be mechanically actuated by driving the ring gear 218 to move either longitudinally inward or longitudinally outward, various alternative embodiments could be used. For example, the switchable wheel end reduction 200 may include a spring or other biasing element that biases the ring gear 218 into an inward position, in which the first clutch 220 is engaged and the second clutch 222 is disengaged, and the switchable wheel end reduction 200 can be mechanically actuated by driving the ring gear 218 to move into a longitudinally outward position, in which the first clutch 220 is disengaged and the second clutch 222 is engaged. Similarly, the switchable wheel end reduction 200 may include a spring or other biasing element that biases the ring gear 218 into an outward position, in which the first clutch 220 is disengaged and the second clutch 222 is engaged, and the switchable wheel end reduction 200 can be mechanically actuated by driving the ring gear 218 to move into a longitudinally inward position, in which the first clutch 220 is engaged and the second clutch 222 is disengaged.

In some embodiments, the shiftable wheel end reduction 200 can be switched or actuated manually, that is, purely mechanically. For example, a driver or operator of the vehicle of which it is a part may actuate a lever or other mechanical switch to directly, manually, mechanically actuate the shiftable wheel end reduction 200 between its two operating modes. In other embodiments, the shiftable wheel end reduction 200 can be switched or actuated manually, that is, by a driver or operator of the vehicle of which it is a part, such as by the driver or operator pushing a button, flipping a switch, etc., which initiates an electrical signal that is communicated, such as by an electronic control unit, to an actuator coupled to the circumferential ridges 218d. When the actuator receives the signal, it can mechanically actuate the shiftable wheel end reduction 200 between its two operating modes. In other embodiments, the shiftable wheel end reduction 200 can be switched or actuated electronically or automatically, that is, without input from a driver or operator of the vehicle of which it is a part. For example, the vehicle may include a number of sensors and collect a number of streams of data, and based on the output received from the sensors and the streams of data received, the electronic control unit can determine that the shiftable wheel end reduction 200 should be shifted between its two operating modes and initiate an electrical signal that is communicated to an actuator coupled to the circumferential ridges 218d. When the actuator receives the signal, it can mechanically actuate the shiftable wheel end reduction 200 between its two operating modes.

In some specific examples, the driver or the electronic control unit may determine that, when an internal combustion engine is operating at below a threshold speed in rpm (revolutions per minute), the shiftable wheel end reduction 200 should be actuated to engage the first clutch 220 and disengage the second clutch 222, and when the internal combustion engine is operating at above the threshold speed in rpm, the shiftable wheel end reduction 200 should be actuated to disengage the first clutch 220 and engage the second clutch 222. Such a threshold speed may be greater than 800, 900, 1000, 1100, 1200, 1300, or 1400 rpm, and/or less than 1600, 1700, 1800, 1900, 2000, 2100, or 2200 rpm. In some cases, the threshold speed may be 1500 rpm. In other examples, the driver or the electronic control unit may determine that, when a vehicle is travelling at below a threshold speed across the ground surface in mph (miles per hour), the shiftable wheel end reduction 200 should be actuated to engage the first clutch 220 and disengage the second clutch 222, and when the vehicle is travelling at above the threshold speed in mph, the shiftable wheel end reduction 200 should be actuated to disengage the first clutch 220 and engage the second clutch 222. Such a threshold speed may be greater than 5, 10, 15, 20, or 25 mph, and/or less than 10, 15, 20, 25, or 30 mph.

In other examples, the driver or the electronic control unit may determine that, when a vehicle (including all cargo and anything being towed) weighs above a threshold weight, the shiftable wheel end reduction 200 should be actuated to engage the first clutch 220 and disengage the second clutch 222, and when the vehicle weighs below the threshold weight, the shiftable wheel end reduction 200 should be actuated to disengage the first clutch 220 and engage the second clutch 222. In other examples, the driver or the electronic control unit may determine that, when a vehicle is traversing a ground surface at an angle above a threshold grade, the shiftable wheel end reduction 200 should be actuated to engage the first clutch 220 and disengage the second clutch 222, and when the vehicle is traversing a ground surface at an angle below the threshold grade, the shiftable wheel end reduction 200 should be actuated to disengage the first clutch 220 and engage the second clutch 222.

In other examples, the driver or the electronic control unit may determine that, when the vehicle is underperforming in terms of power, speed, acceleration, etc., relative to performance demanded by the driver, the shiftable wheel end reduction 200 should be actuated to engage the first clutch 220 and disengage the second clutch 222, and when the vehicle is performing or overperforming relative to performance demanded by the driver, the shiftable wheel end reduction 200 should be actuated to disengage the first clutch 220 and engage the second clutch 222. In other examples, any number of the aforementioned factors may be used in combination with one another to determine when the shiftable wheel end reduction 200 should be actuated to engage the first clutch 220 and disengage the second clutch 222, and when the shiftable wheel end reduction 200 should be actuated to disengage the first clutch 220 and engage the second clutch 222.

The present disclosure has primarily illustrated and discussed one driven axle shaft, one wheel, and one shiftable wheel end reduction connecting the driven axle shaft to the wheel. In practice, many wheeled vehicles such as automobiles have at least two axle shafts, with at least two wheels mounted at opposite ends of each of the axle shafts. Thus, the features described herein for the switchable wheel end reduction 200 may be provided for two wheels at opposite ends of a driven axle shaft. Further, the features described herein for the switchable wheel end reduction 200 may be provided for two wheels at opposite ends of each of two driven axle shafts. In general, the features described herein for the switchable wheel end reduction 200 may be provided for any number of driven wheels mounted on any number of driven axle shafts. In some embodiments where a vehicle has multiple switchable wheel end reductions as described herein, each of the shiftable wheel end reductions may be independently controllable such that they can be actuated between their operating modes independently. In other embodiments where a vehicle has multiple switchable wheel end reductions as described herein, each of the shiftable wheel end reductions may be controllable as a unit rather than independently, such that they can be actuated to switch between their operating modes in unison or simultaneously.

The shiftable wheel end reduction described herein provides various advantages. For example, the shiftable wheel end reduction allows the driven wheels of a vehicle to be operated in two different operating modes: a first relatively high-torque and low-speed operating mode and a second relatively low-torque and high-speed operating mode. By providing these mechanical components adjacent to the driven wheels rather than elsewhere in the power train, most of the components of the power train can be made smaller and more efficiently because they can be designed for relatively high speeds and relatively low torque loads, while still being able to provide a larger torque to the wheels. This can free up valuable space throughout the power train and reduce overall costs. Because torque is increased at the shiftable wheel end reduction primarily at low operating speeds, there is little cost associated with increased speed of components in the power train when the shiftable wheel end reduction is increasing the torque.

Using the switchable wheel end reduction 200 to increase torque is associated with some energy losses to friction within the planetary gear set, which can also result in generation of waste heat. Thus, the switchable wheel end reduction 200 may be provided with a lubricant and/or a coolant to reduce friction losses and mitigate heat generation. In some cases, a pump, such as a gerotor pump, may be provided, for example, between the sun gear 212 and the gear carrier 206, which can be automatically actuated to operate and pump the lubricant and/or coolant when the switchable wheel end reduction is increasing torque and which can be automatically actuated to not operate and not pump the lubricant and/or coolant when the switchable wheel end reduction is not increasing torque.

The technologies described herein may be used in any wheeled vehicle, such as passenger vehicles, trucks, heavy-duty trucks, etc., and with any motors or engines, including internal combustion engines, including diesel engines. The technologies described herein may be particularly useful, however, in electric vehicles driven by electric motors or other electric propulsion units, at least because electric powertrains typically have an advantage in reaction speed and can therefore more quickly synchronize the clutches with electric motor(s).

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A wheeled vehicle, comprising:
   an axle body;
   a driven axle shaft;
   a driven wheel;
   a shiftable wheel end reduction mechanically coupled to the driven axle shaft and to the driven wheel, the shiftable wheel end reduction including a planetary gear set that includes an outer ring gear, a plurality of planet gears, a gear carrier, and a sun gear, wherein the gear carrier is rotatably mounted on the axle body by a roller bearing;
   a first clutch having an engaged configuration, in which the outer ring gear is rigidly coupled and mechanically locked to the axle body, and a disengaged configuration, in which the outer ring gear is rotatable with respect to the axle body;
   a second clutch having an engaged configuration, in which the outer ring gear is rigidly coupled and mechanically locked to the gear carrier, and a disengaged configuration, in which the outer ring gear is rotatable with respect to the gear carrier; and
   an actuator that extends through an opening in the axle body and mechanically engages with the outer ring gear inside the axle body, wherein the actuator is configured to move the outer ring gear inward towards the axle body to engage the first clutch and disengage the second clutch, and wherein the actuator is configured to move the outer ring gear outward away from the axle body to disengage the first clutch and engage the second clutch, and
   wherein the shiftable wheel end reduction is configured to be switched between a first operating mode, in which torque carried by the driven axle shaft is modified and transferred to the driven wheel by the shiftable wheel end reduction, and a second operating mode, in which torque carried by the driven axle shaft is maintained and transferred to the driven wheel by the shiftable wheel end reduction.

2. The wheeled vehicle of claim 1, wherein the driven wheel is rigidly coupled to the gear carrier.

3. The wheeled vehicle of claim 1, wherein the sun gear is rigidly coupled to the driven axle shaft.

4. The wheeled vehicle of claim 1, wherein the wheeled vehicle is an electric vehicle including an electric motor that generates mechanical power and supplies the mechanical power to the driven axle shaft.

5. The wheeled vehicle of claim 1, wherein the driven wheel is coupled to a first end of the driven axle shaft and the wheeled vehicle further comprises:
 a second driven wheel coupled to a second end of the driven axle shaft opposite to the first end of the driven axle shaft; and
 a second shiftable wheel end reduction mechanically coupled to the driven axle shaft and to the second driven wheel;
 wherein the second shiftable wheel end reduction is configured to be switched between a first operating mode, in which torque carried by the driven axle shaft is increased and transferred to the second driven wheel by the second shiftable wheel end reduction, and a second operating mode, in which torque carried by the driven axle shaft is maintained and transferred to the second driven wheel by the second shiftable wheel end reduction.

6. The wheeled vehicle of claim 1, wherein, in the first operating mode, torque carried by the driven axle shaft is increased by a factor of between 2 and 5 and transferred to the driven wheel by the shiftable wheel end reduction.

7. A method of operating a wheeled vehicle, comprising:
 switching a shiftable wheel end reduction from a first operating mode, in which torque carried by a driven axle shaft is modified and transferred to a driven wheel by the shiftable wheel end reduction, to a second operating mode, in which torque carried by the driven axle shaft is maintained and transferred to the driven wheel by the shiftable wheel end reduction,
 wherein the shiftable wheel end reduction includes a planetary gear set including an outer ring gear, a plurality of planet gears, a gear carrier, and a sun gear, the gear carrier being rotatably mounted on an axle body of the wheeled vehicle by a roller bearing, and
 wherein in switching the shiftable wheel end reduction from the first operating mode to the second operating mode includes disengaging a first clutch such that the outer ring gear is rotatable with respect to the axle body and engaging a second clutch such that the outer ring gear is rigidly coupled and mechanically locked to the gear carrier by moving the outer ring gear outward away from the axle body to disengage the first clutch and engage the second clutch via an actuator that extends through an opening in the axle body and mechanically engages with the outer ring gear inside the axle body.

8. The method of claim 7, further comprising, simultaneously with the switching of the shiftable wheel end reduction:
 switching a second shiftable wheel end reduction from a first operating mode, in which torque carried by the driven axle shaft is increased and transferred to a second driven wheel by the second shiftable wheel end reduction, to a second operating mode, in which torque carried by the driven axle shaft is maintained and transferred to the second driven wheel by the second shiftable wheel end reduction.

9. A method of operating a wheeled vehicle, comprising:
 switching a shiftable wheel end reduction from a first operating mode, in which torque carried by a driven axle shaft is maintained and transferred to a driven wheel by the shiftable wheel end reduction, to a second operating mode, in which torque carried by the driven axle shaft is modified and transferred to the driven wheel by the shiftable wheel end reduction,
 wherein the shiftable wheel end reduction includes a planetary gear set including an outer ring gear, a plurality of planet gears, a gear carrier, and a sun gear, the gear carrier being rotatably mounted on an axle body of the wheeled vehicle by a roller bearing, and
 wherein switching the shiftable wheel end reduction from the first operating mode to the second operating mode includes engaging a first clutch such that the outer ring gear is rigidly coupled and mechanically locked to the axle body and disengaging a second clutch such that the outer ring gear is rotatable with respect to the gear carrier by moving the outer ring gear inward toward the axle body to engage the first clutch and disengage the second clutch via an actuator that extends through an opening in the axle body and mechanically engages with the outer ring gear inside the axle body.

10. The method of claim 9, further comprising, simultaneously with the switching of the shiftable wheel end reduction:
 switching a second shiftable wheel end reduction from a first operating mode, in which torque carried by the driven axle shaft is maintained and transferred to a second driven wheel by the second shiftable wheel end reduction, to a second operating mode, in which torque carried by the driven axle shaft is increased and transferred to the second driven wheel by the second shiftable wheel end reduction.

\* \* \* \* \*